United States Patent
Joshi et al.

(10) Patent No.: US 9,003,354 B2
(45) Date of Patent: Apr. 7, 2015

(54) OPTIMIZING MEMORY USAGE AND SYSTEM PERFORMANCE IN A FILE SYSTEM REQUIRING ENTIRE BLOCKS TO BE ERASED FOR REWRITING DATA

(75) Inventors: Rohit Joshi, Bangalore (IN); Sabyasachi Dey, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1226 days.

(21) Appl. No.: 11/309,249

(22) Filed: Jul. 20, 2006

(65) Prior Publication Data
US 2008/0071723 A1    Mar. 20, 2008

(51) Int. Cl.
*G06F 9/44* (2006.01)
*G06F 17/30* (2006.01)

(52) U.S. Cl.
CPC ............................... *G06F 17/30067* (2013.01)

(58) Field of Classification Search
None
See application file for complete search history.

(56) References Cited

U.S. PATENT DOCUMENTS

| | | | |
|---|---|---|---|
| 6,697,928 B2 * | 2/2004 | March et al. | 711/171 |
| 7,802,064 B2 * | 9/2010 | Kim | 711/157 |
| 2007/0288553 A1* | 12/2007 | Donaghey et al. | 709/203 |

OTHER PUBLICATIONS

Rohit Joshi Linear File System, LOCOSTO PROGRAM—Version 0.1, pp. 1-8, Unpublished as of Jul. 20, 2006.
JFFS—Journaling Flash File System by Axis Communications AB in Sweden. pp. 1-6, Nov. 26, 2001.

* cited by examiner

*Primary Examiner* — Chuck Kendall
(74) *Attorney, Agent, or Firm* — Ronald O. Neerings; Frank D. Cimino

(57) ABSTRACT

A file system which ensures that some of the (desired) files ("linear files") are stored in corresponding exclusive blocks (i.e., a block that stores data corresponding to one file only). Due to such a feature, rewriting of data corresponding to other files would not cause data corresponding to linear files to be relocated/rewritten. Such a feature may provide reliable and steady retrieval of data of the corresponding file from a flash memory organized as sectors. According to another aspect, some of the files ("non-linear files") are stored in non-exclusive blocks (i.e., multiple files can share the same block or the same file can span multiple blocks without contiguity).

18 Claims, 7 Drawing Sheets

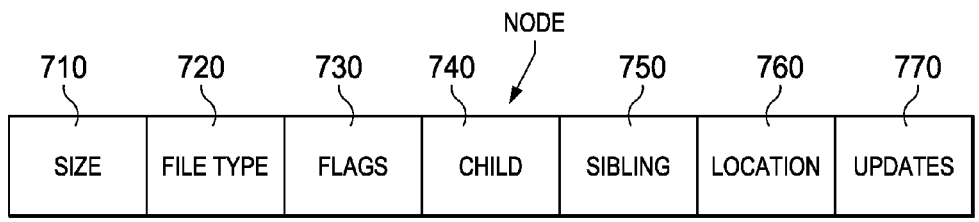
FIG. 5
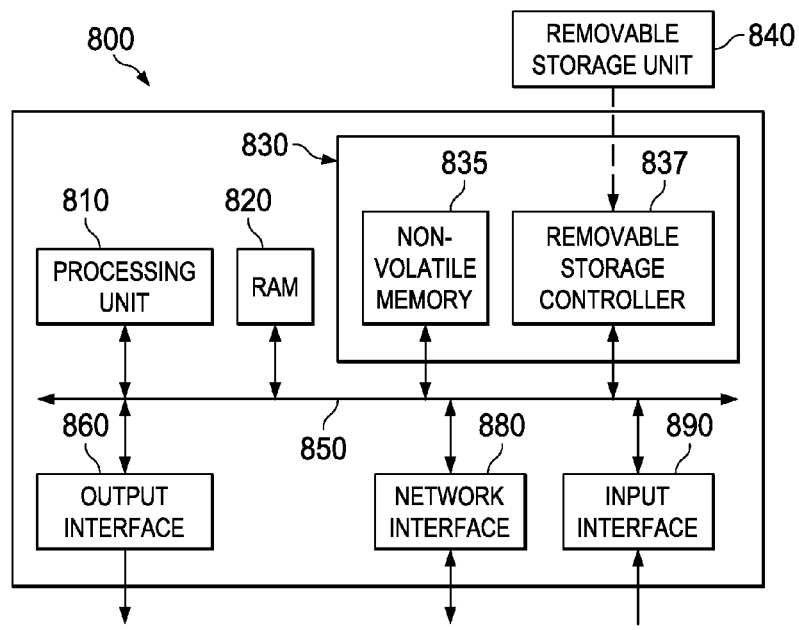
FIG. 7
FIG. 8

OPTIMIZING MEMORY USAGE AND SYSTEM PERFORMANCE IN A FILE SYSTEM REQUIRING ENTIRE BLOCKS TO BE ERASED FOR REWRITING DATA

BACKGROUND

1. Field of the Invention

The present invention relates generally to electronic computing systems and more specifically to optimizing memory usage and system performance in a file system (e.g., resident on flash memory) requiring entire blocks to be erased for rewriting data.

2. Related Art

There are technologies which require an entire block of data to be erased even if only a portion (e.g., byte) of the block needs to be rewritten (i.e., write in locations which are already storing data). Flash memory is an example implementing such a technology. In general, a flash memory provides address, data and control signal interfaces to a computing device (such as a microprocessor), through which information (data, code, etc.) may be stored and retrieved.

Systems such as hand-held terminals, PDAs (personal digital assistant), cell phones etc., often use flash memories for storing code (software instructions) and data. Data may be organized as files and all actions (read, write, erase etc) on data may be facilitated by a file system. Such a file system for flash memories (called a flash file system or FFS) often provides a user application with suitable interfaces (such as function calls) through which various operations such as file create, append, erase, etc., may be performed.

A sector (block) in a flash memory may store data related to one or more files. In such a case, modification to one file may require the entire sector to be erased. Consequently, an FFS may need to relocate data of the other files (sharing the sector to be erased) to other sectors in flash. Further, an FFS may cause a single file to be stored in non-contiguous blocks of memory resulting in a segmented file structure, thus slowing system throughput (since a new access sequence may need to start for non-contiguous locations).

To overcome some of these undesirable effects, files may be copied from flash memory and stored in a RAM (random access memory) at system start-up time. This, however results in duplication of files and may be undesirable, especially in hand-held devices such as cell phones, PDAs, etc., due to the limited availability of resources. At least when handling certain types of files (such as MIDI files) where it is generally desirable to provide continuous stream of data, it may be desirable to have a file system optimize system performance and/or memory usage.

Accordingly, what is needed is a file system which addresses one or more of such requirements/problems described above.

BRIEF DESCRIPTION OF THE DRAWINGS

The present invention will be described with reference to the following accompanying drawings, which are described briefly below.

FIG. 5 is a diagram of an example table containing sector allocation information for files, according to an aspect of the present invention.

FIG. 7 is a diagram showing the various fields associated with a node in an embodiment of the present invention.

FIG. 8 is a block diagram of an example device in which various aspects of the present invention may be implemented.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention allocates a block exclusively (so that not shared by other files) for a file ("linear file") if so requested. Several advantages may be obtained due to such an exclusive allocation. For example, rewriting operations directed to other files would not cause data corresponding to the linear files to be relocated.

Another aspect of the present invention enables files (non-linear files) which can be stored in blocks, which allow more than one file to be stored in a block. Such a feature enables the blocks to be shared efficiently among many files.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1A:
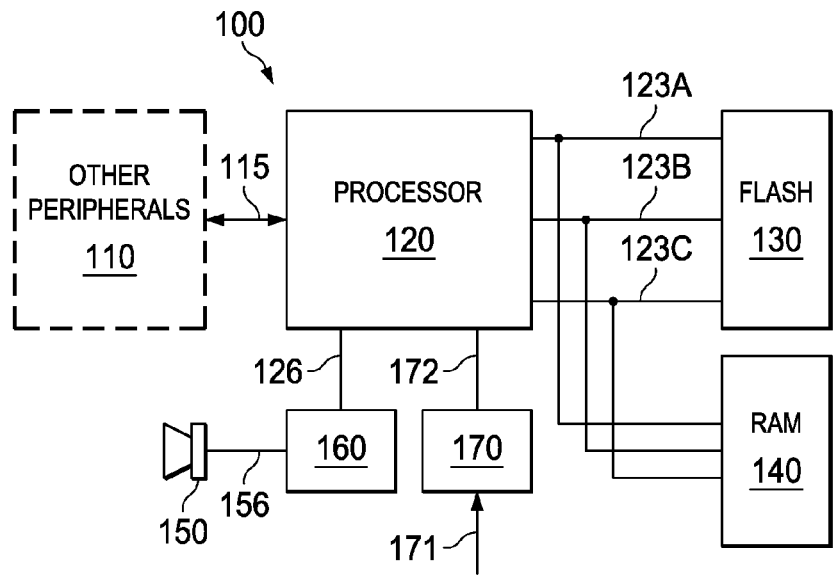
FIG. 1A illustrates an example system in which several aspects of the present invention may be implemented.

FIG. 1A is a block diagram containing digital processing system 100 in which several aspects of the present invention may be implemented. The system there represents an audio player (potentially part of another device such as a cell phone or a personal digital assistant), which can play various songs (for example, stored in musical instrument digital interface or MIDI format) stored in flash 130. Digital processing system 100 is shown containing processor (uP) 120, flash 130, RAM (random access memory) 140, output controller 160, input controller 170, and other peripherals block 110. The components of digital processing system 100 are described below.

Output controller 160 receives audio data from processor 120 on path 126, and generates the appropriate electrical signals on path 156 to cause an output device (e.g., speaker 150) to play the corresponding audio data. Input controller 170 receives various commands (e.g., rewind, play, increase volume) from an input device (not shown) via path 171, and passes data representing the commands to processor 120 on path 172.

Processor 120 may execute various instructions stored in flash 130 to enable a user to play various songs stored in data/file area 130-1. Processor 120 communicates with flash 130 and RAM 140 through paths 123A (address), 123B (data) and 123C (control). Though shown as a single unit, processor 120 may potentially contain multiple units possibly adapted for specific tasks. Communication between processor 120 and other peripherals block 110 occurs via path 115 which may contain multiple signal connections, although not explicitly shown.

RAM 140 may be used to store temporary data required during execution of various instructions by processor 120. Other peripherals block 110 may contain various digital and/or analog blocks (such as digital-to-analog and analog-to-digital converters, time-keeping features or any other feature specific blocks) providing various user level features to digital processing system 100.

Flash 130 is internally organized as several memory blocks (sectors, not shown in FIG. 1A). Though flash 130 is shown with interface signals corresponding to NOR-flash technology, alternative embodiments can be employed with alternative technologies such as NAND-flash technology well known in the relevant arts. Modifying contents of a memory location within a sector generally requires erasure of the entire sector in which the memory location is located. A file may be stored within a sector or may span multiple sectors. Various aspects of the present invention optimize memory usage and system performance in such a situation as described below with respect to an example implementation of flash memory.

3. Example Flash Memory

Figure 1B:
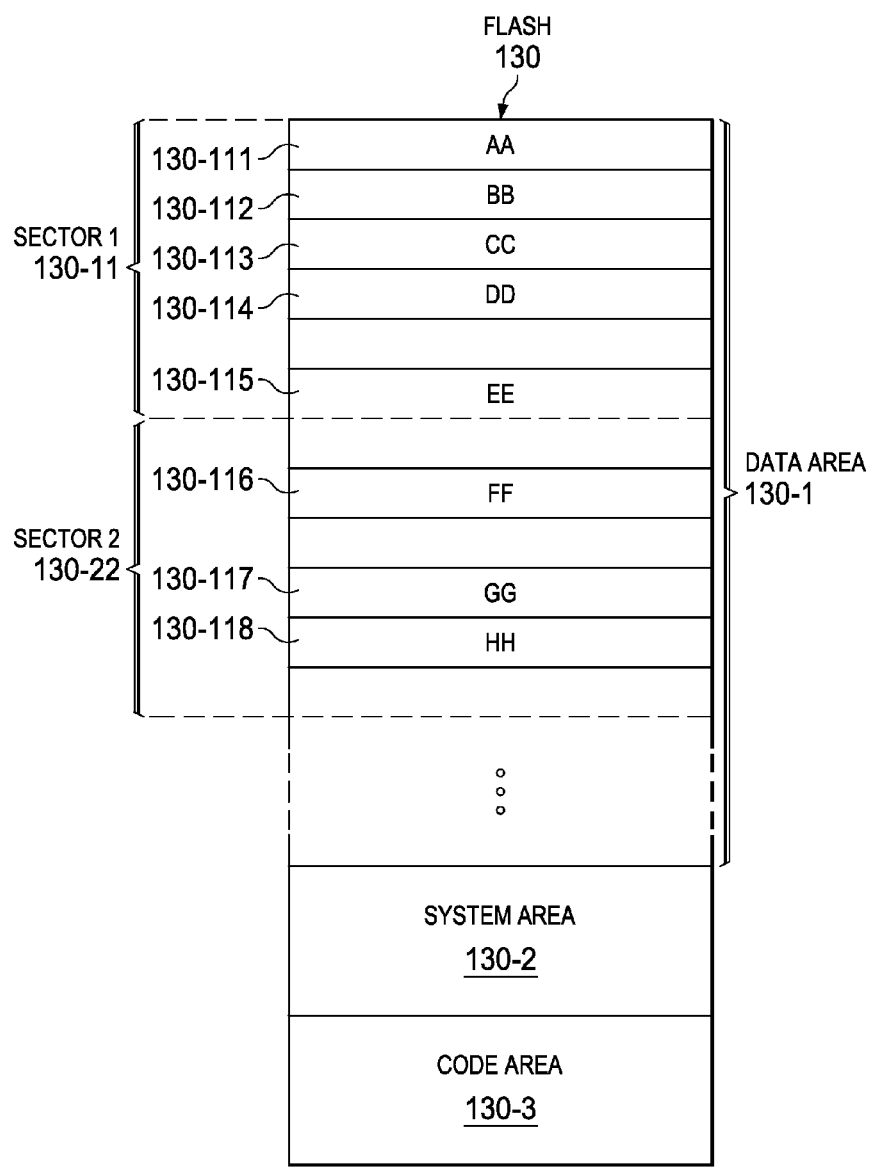
FIG. 1B is a block diagram showing an exemplary organization of a non-volatile memory (flash) used in the example system of FIG. 1A, and illustrating how files may be stored according to a prior file system.

FIG. 1B shows flash 130 as containing three logical portions—data area 130-1, system area 130-2, and code area 130-3. Although each of 130-1 through 130-3 is shown as contiguous in FIG. 1B, other organizations of the areas (such as discontinuous segments) can be employed in alternative embodiments.

Code area 130-3 is reserved for storing the instructions (to be executed by processor 120) to provide the various utilities (or user level features) of digital processing system 100.

Data area 130-1 stores user data in corresponding file formats. For instance, data area 130-1 may store data representing several songs (for example, in MIDI format). Each file is stored in one or more sectors according to the data stored in system area 130-2. Data area 130-1 may span across multiple sectors of flash 130. Two such sectors 130-11 and 130-22 for data area 130-1 are shown in FIG. 1B. Code area 130-3 and system area 130-2 may also span across sectors, though not expressly shown in FIG. 1B.

System area 130-2 may be used for storing information regarding user data (stored, for example, in data area 130-1) that allows logical organization of such user data (for example, in the form of directories and files) and facilitates access to the same. Thus, system area 130-2 may contain metadata in the form of data structures (often called inodes) to maintain file system control information.

In general, access by processor 120 to data/files in data area 130-1 may be facilitated by a file system which operates using the information stored in system area 130-2. The corresponding instruction sequences implementing the file system may be stored in code area 130-3. An example (prior) file system operation is described next.

4. Prior File System and Problems

Figure 2A:
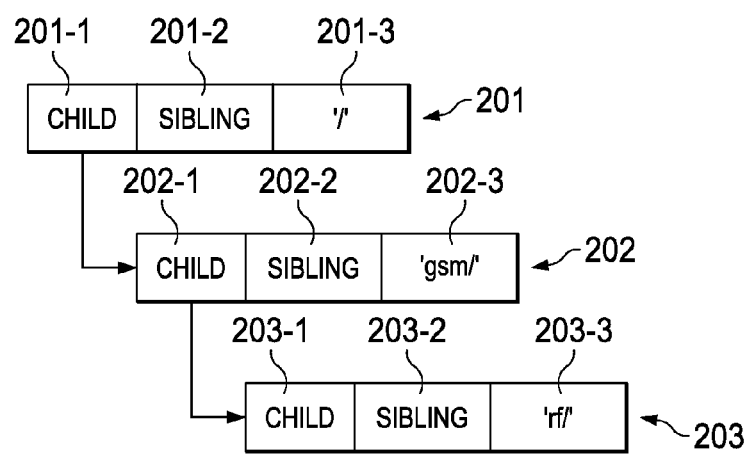
FIGS. 2A, 2B and 2C are diagrams depicting the logical organization of data/files according to a prior file system used in the example system of FIG. 1B.
Figure 2B:
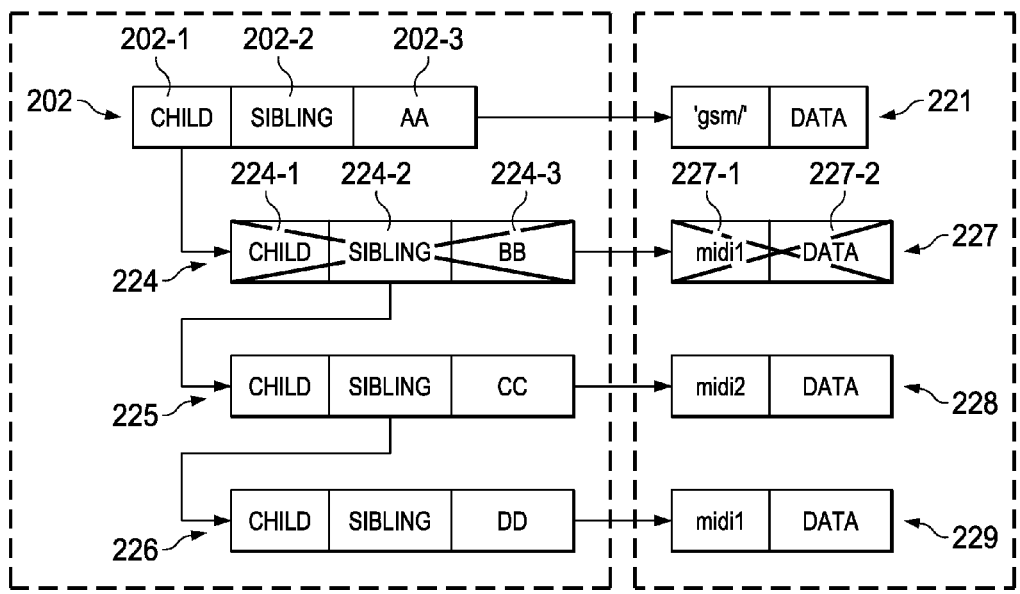
Figure 2C:
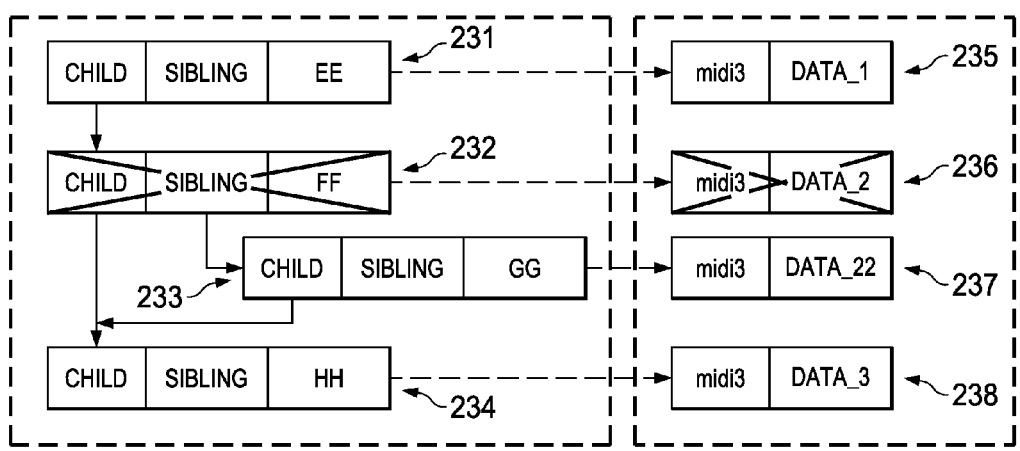

An example prior file system that may be used in digital processing system 100 (FIG. 1) is illustrated in FIGS. 2A, 2B and 2C. References are made to FIG. 1B also for illustration.

FIGS. 2A, 2B and 2C are diagrams depicting the logical organization of data/files on flash 130 of FIG. 1B. Each file/directory is associated with a corresponding data structure (node) containing various information-bearing fields facilitating access to files in the system as is described below. Not all fields are shown in the data structures/nodes, instead only fields as relevant to the description of the examples are shown.

FIG. 2A shows a file named "rf" stored under a sub-directory "gsm" which in turn is stored under a root directory ("/"). Nodes 201, 202 and 203 represent the "root", "gsm" and file "rf" respectively. 201-1 contains a link (for example, starting address) to sub-directory "gsm". Similarly, 202-1 contains a link (for example, starting address) to file "rf". Sibling fields 201-2, 202-2 and 203-2 may contain links to other directories/files (not shown) at the same hierarchical level as the corresponding directories/files represented by 201, 202 and 203 respectively. Fields 201-3, 202-3 and 203-3 contain the name associated with the corresponding directory/file.

Nodes 201, 202 and 203 (commonly referred to as inodes) are stored in system area 130-2 of flash 130 (FIG. 1B). Data corresponding to files such as file "rf" of FIG. 2A are stored in data area 130-1 (FIG. 1B) and are accessible via links to starting addresses (not shown) of such files contained in nodes similar to as in FIG. 2A. For example, node 203 may contain a field containing a link to data related to file "rf".

FIG. 2B illustrates how modifications to an example file midi1 are handled by a prior file system. Files midi1 and midi2 are shown stored under directory gsm. Entries 202, 224, 225 and 226 are the nodes representing sub-directory gsm and files midi1 and midi2 as described below.

Nodes 202, 224, 225 and 226 are stored in system area 130-2 of flash 130 of FIG. 1B, and corresponding files/directories 221, 227, 228 and 229 are stored in data area 130-1 of flash 130 of FIG. 1B.

Node 202 contains a "location" field 202-3 with address AA indicating that the associated sub-directory "gsm" is stored at address AA. Thus file/directory 221 shown in FIG. 2B has a starting address (130-111) located in sector 1 (130-11) as shown in FIG. 1B. Similarly, files midi1 and midi2 are located in sector 1 (130-11) at corresponding addresses indicated by corresponding location field entries BB, CC and DD corresponding to memory areas 130-112 through 130-114 respectively, as shown in FIG. 1B.

It may be observed from FIG. 2B that the "child" field (202-1) of 202 links to node 224 associated with file midi1. Field 202-2 may contain a value indicating that there are no files/directories at the same hierarchical level as sub-directory gsm. 202-3 contains the location (address) of the contents of sub-directory gsm.

The "sibling" field 224-2 of node 224 contains the address of node 225 associated with file midi2. The link to node 225 (associated with file midi2) from the "sibling" field of file midi1 indicates that files midi1 and midi2 are at the same hierarchical level. The "sibling" field of node 225 (not numbered) may initially be blank indicating there are no other files at the same hierarchical level.

When data in midi1 needs modification, a new node 226 is created to represent file midi1. The "sibling" field of node 225 is accordingly updated to contain the address of the new node 226. Node 224 that was earlier associated with midi1 is marked as obsolete (in a corresponding field in node 224, not shown. However the link to node 225 via "sibling" field 224-2 is still used by the file system). Data associated with midi1 is written along with the modifications in data area indicated by 229. Node 226 is written with a link to modified midi1 229.

The example illustrated with respect to FIG. 2B corresponds to a situation where a file is smaller in size and is written in a single pass (undivided operation). When files are large, or are written to (appended) at discontinuous instants of time, each write operation may store a corresponding chunk of data. Such chunks of data associated with a file may be located in non-contiguous portions of data area 130-1, often spanning multiple sectors. Accordingly, each chunk is associated with a corresponding node, as described next.

FIG. 2C illustrates a situation in which data corresponding to a file is stored in multiple sectors. In particular, file "midi3" is shown stored as three chunks of data, where the first chunk is located at address EE (130-115) in sector 1(130-11), and the remaining two chunks at addresses (FF/130-116 and HH/130-118) in sector 2 (130-22) shown in FIG. 1B, as indicated by the contents of the corresponding location fields Modified chunk 237 is shown located at address GG(130-117).

Entries 231-234 represent nodes containing information regarding the corresponding chunks 235-238. Chunk 235 of FIG. 2C corresponds to EE(130-115) of FIG. 1B. Similarly Chunks 236, 237 and 238 of FIG. 2C correspond to FF (130-116), GG(130-117) and HH(130-118) of FIG. 1B.

Initially a first chunk 235 with corresponding node 231 is written. When a second chunk 236 is appended, the "child" field of node 231 is updated to contain the address of a new node 232 associated with chunk 236. Similarly, when a third chunk 238 is appended, the "child" field of node 232 is updated to contain the address of a new node 234 associated with chunk 238.

When chunk 236 is to be modified, data_2 is written along with modifications in a new (free) memory chunk in data area 130-1 of flash 130 (FIG. 1B). This is represented by chunk 237 in FIG. 2C, and a corresponding node 233 is created. The "sibling" field of node 232 is updated to contain a link to node 233, and node 232 is marked as obsolete (However, the link to node 233 via the "sibling field" of node 232 is still used by the file system). The "child" field of node 233 is written with a link to node 234. Thus in this example file system, a link from a "sibling" field marked as obsolete indicates a modified portion of a file.

Thus, it may be appreciated that a sector may contain multiple files, and a file may span multiple sectors of flash 130. Several such nodes may be present in system area 130-2 (FIG. 1B), each representing corresponding directories/files. On system start-up, processor 120 may read/scan the system area 130-2 and determine all root directories (nodes) and store the corresponding start addresses in RAM 140 or in internal registers (not shown). Any access to sub-directories/files may then be quickly performed by scanning/following the link information (child/sibling/location fields) contained in corresponding nodes. Thus, the file system facilitates access (storage/retrieval/updates) to files/directories in the system.

The file system described above has some disadvantages, at least in handling certain types of files in certain environments such as hand-held devices. This is briefly described next.

5. Disadvantages of the Prior File System

As described above multiple files may be stored in a sector, and a file may also span multiple sectors.

As files are modified, free memory areas are used to write the modified files, as described above. The file system described above, thus has to periodically erase old data/file areas which are no longer in use so that memory is freed to accommodate new data/files, or modifications to files.

Devices such as flash 130 can be only be erased sector-wise. Thus, it is possible in an environment such as that of FIGS. 1A/1B, that a file access may have to be temporarily interrupted to allow relocation to a new memory area. This is made clear with an example scenario below.

If sector 1 (130-11) of FIG. 1B needs to be erased any access to file midi2 (located in sector 1) will have to be delayed or interrupted till sector erasure operation is completed. This, however, may not be desirable since file midi2 represents audio data. An interruption in access of file midi2 may cause a discernable interruption in the audio stream. A delay in accessing file midi2 may also be undesirable.

Further, when files have a segmented structure as illustrated in FIG. 2C, access may become slower due to the need to retrieve the links to the various chunks. For example, from FIGS. 1B and 2C, one chunk of file midi3 is stored in sector 1 (130-11), while the remaining chunks are stored in sector 2 (130-22), consequently slowing down access. One possible solution to overcoming the above noted disadvantages is to copy an entire file to RAM (random access memory) 140. This, however, may not be desirable in an embedded systems (for example, as in a hand-held device) environment since such may be wasteful of physical resources as well as time delays (which are preferably avoided).

In general, the file system described above may have disadvantages in handling files (for example, audio files) where uninterrupted access and low access delays are desired.

Various aspects of the present invention address at least some of these disadvantages, by incorporating linear files within the system. A linear file is one which is entirely stored in a single contiguous block of memory lying within the bounds of a sector. The file system may use an extra field in the corresponding node of a file to indicate whether the file is of linear or non-linear type. A flow chart illustrating how linear files are handled according to an aspect of the present invention is described next.

6. Linear Files

Figure 3:
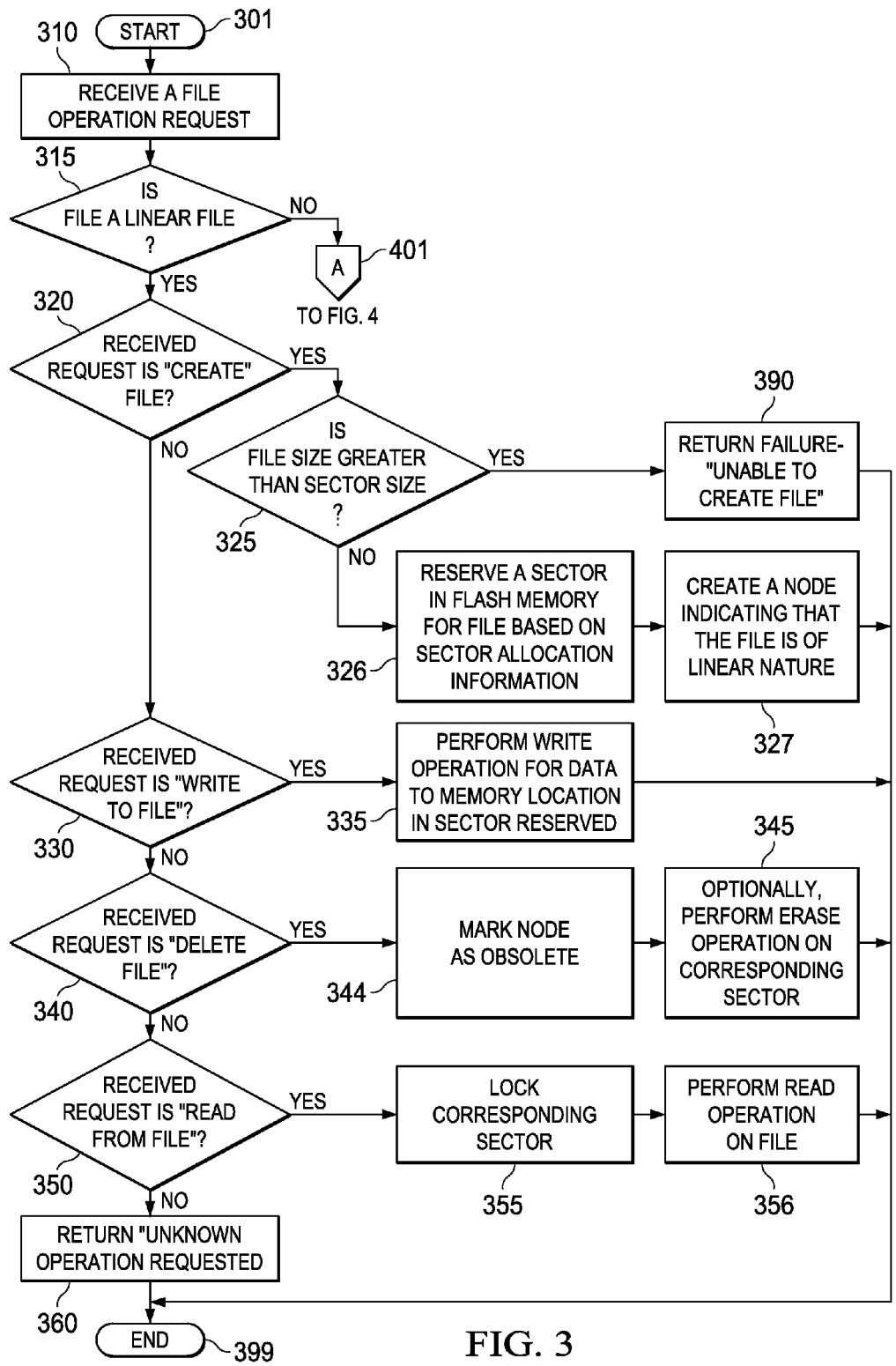
FIG. 3 is a flow chart illustrates the manner in which linear files are handled according to an aspect of the present invention.

FIG. 3 is a flow chart illustrates the manner in which linear files are handled according to an aspect of the present invention. The flow chart is described with reference to FIG. 5 which shows an example table containing sector allocation information for files in the system. The flow chart starts at step 301 where control immediately passes to step 310.

In step 310, the file system receives a request for an operation on a file. Such a request may be received along with the file name and the operation to be performed (such as create, append, delete, read etc). Control passes to step 315.

In step 315, the file system determines whether the request received is for an operation on a linear file or a non-linear file. In case of create file operation, the determination may be performed based on information received along with the request. For operations related to files already created, the file system may make such a determination by reading the "filetype" field of the node associated with the file. If the file is a linear file, control passes to step 320, else control passes to step 401 (described with respect to FIG. 4 which illustrates how non-linear files are handled).

In step 320, the file system determines based on the received request whether the request is to create a file. If yes, control passes to step 325, else control passes to step 330.

In step 325, the file system determines whether the file size is larger than the size of a sector in flash memory. The file size may be received as a parameter of the create request of step 310. If the file size is greater than the size of a sector in the flash memory, control passes to step 390, else control passes to step 326.

In step 326, the file system allocates a sector in flash for storing the file. Such allocation may be done by inspecting a sector allocation information table such as that shown in FIG. 5. The table of FIG. 5 is shown with column 1 containing the sector numbers and column 2 containing the state of the corresponding sector. Sectors 1 and N are indicated as being blank, and hence are available for writing a linear file. Sector 2 is indicated as containing garbage, i.e., contains obsolete data and can be used for storing a linear file after being erased. Sector 3 is indicated as containing valid data, and hence cannot be used for storing a linear file. Control then passes to step 327.

In step 327, the file system creates a file descriptor (node) for the linear file to be created. Appropriate entries are made to the various fields of the node. The file system may choose to create the linear file in sector 1, and corresponding starting address of sector 1 may be entered in a corresponding location field of the node created for the file. Control passes to step 399, where the flowchart ends.

In step 330, the file system determines whether the request received in step 310 is for a write operation to a file. If yes, control passes to step 335, else control passes to step 340.

In step 335, the file system writes file data in the memory area within the sector reserved in step 326. The file system determines the memory address/sector at which data has to be written by reading the corresponding location field in the node associated with the file.

Data to be written to the file may be forwarded by the user application that requested the file operation. Typically, this is done via a function call. File data is written in sequential/contiguous locations in memory in the sector reserved. Control passes to step 399, where the flowchart ends.

In step 340, the file system determines whether the request received in step 310 is for a delete operation on a file. If yes, control passes to step 344, else control passes to step 350.

In step 344, the file system enters a value in a "file valid/obsolete" field in the node associated with the file to indicate that the file data is obsolete. An entry may also be made to the sector allocation table to indicate that the corresponding sector contains "garbage" i.e. data that is obsolete (as shown for sector 2 in FIG. 5). Control passes to step 345.

In step 345, the file system may perform a sector erase operation on the sector that was marked as having obsolete data due to the deletion operation on the file (step 344). This step may be optional in the flow chart of FIG. 3, and the sector erase operation may also be performed at a later stage. Control passes to step 399, where the flowchart ends.

In step 350, the file system determines whether the request received in step 310 is for a read operation on a file. If yes, control passes to step 355, else control passes to step 360.

In step 355, the file system determines the sector containing the file to be read by reading the memory address from the location field contained in the node associated with the file to be read. The file system then marks the corresponding sector as "locked", thus preventing an erase operation on the sector till such time as the file data is read. The "lock" operation prevents relocation of the file to another sector and facilitates uninterrupted read operation of data pertaining to the file. Such a "lock" indication may be entered in a corresponding flag stored in RAM (Random Access Memory) 140. Control passes to step 356.

In step 356, the file system reads the data pertaining to the file. The file system may also forward the data to a user application that requested the read operation. Control passes to step 399, where the flowchart ends.

In step 360, the file system returns a value to the application that requested the file operation, indicating that an unknown operation was requested. Control passes to step 399, where the flowchart ends.

The above flowchart described the manner in which a file system may handle operations on a linear file. It may be appreciated from the foregoing description that providing linear files may permit uninterrupted read access to such files, thus overcoming some of the limitations of the example prior file system noted above. While certain operations on files have been described in the flow chart of FIG. 3, various other operations may also be possible.

In example environments such as the one illustrated in FIG. 1A, it may be desirable to provide a file system that provides for handling non-linear files as well as linear files. An aspect of the invention provides for non-linear files to co-exist with linear files. Accordingly, the description of the flow chart of FIG. 3 is continued with respect to the flow chart of FIG. 4, where handling of non-linear files is described very briefly.

7. Co-Existence with Non-Linear Files

Figure 4:
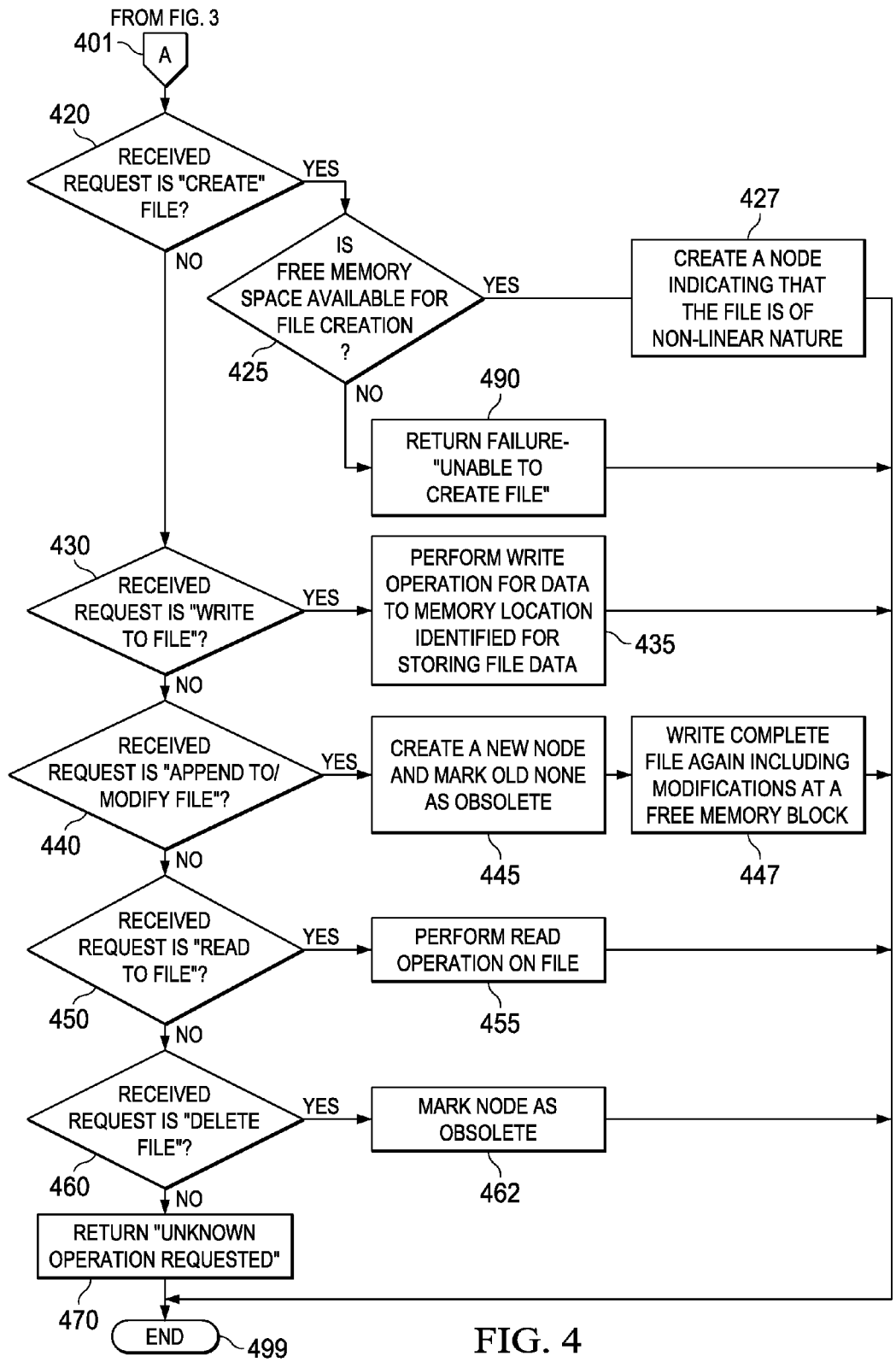
FIG. 4 is a flow chart illustrating the manner in which non-linear files are handled.

The flow chart of FIG. 4 starts at 401 where control immediately passes to step 420. It may be noted that control is passed to 401 from step 315 of the flowchart of FIG. 3, if it is determined that the operation requested is not for a linear file. Thus, 401 indicates that an operation on a non-linear file was requested.

In step 420, the file system determines based on the received request whether the request is to create a file. If yes, control passes to step 425, else control passes to step 430.

In step 425, the file system determines whether free memory space is available for creating the file. If yes, control passes to step 427, else control passes to step 490.

In step 427, the file system creates a file descriptor (node) for the non-linear file to be created. Appropriate entries are made to the various fields of the node. The file system selects a free memory area within data area 130-1 of FIG. 1B, and corresponding starting address of the memory area may be entered in a corresponding location field. Control passes to step 499, where the flowchart ends.

In step 430, the file system determines whether the request received from 401 is for a write operation to a file. If yes, control passes to step 435, else control passes to step 440.

In step 435, the file system writes file data in the memory area selected in step 427.

The file system determines the memory address/sector at which data has to be written by reading the corresponding location field in the node associated with the file.

Data to be written to the file may be forwarded by the user application that requested the file operation. Typically, this is done via a function call. Data written may span multiple sectors if so required. Control passes to step 499, where the flowchart ends.

In step 440, the file system determines whether the request received in 401 is for a modifying an existing file. If yes, control passes to step 445, else control passes to step 450.

In step 445, the file system creates a new node for the modified file. The file system may enter a value in a "file valid/obsolete" field in the node associated with the old file (i.e., before modification) to indicate that the old file data is obsolete. Control passes to step 447

In step 447, the file system writes the file along with modifications in a new (free) memory location. In steps 445 and 447 the file system may perform operations consistent with the description in sections above. Control passes to step 499, where the flowchart ends.

In step 450, the file system determines whether the request received in 401 is for a read operation on a file. If yes, control passes to step 455, else control passes to step 460.

In step 455, the file system determines the starting of the memory address containing the file to be read by reading the memory address from the location field contained in the node associated with the file to be read. The file system then reads the data contained in the file. The file system may also forward the data to a user application that requested the read operation. Control passes to step 499, where the flowchart ends.

In step 460, the file system determines whether the request received in 401 is for a delete operation on a file. If yes, control passes to step 462, else control passes to step 470.

In step 462, the file system marks a value in a "file valid/obsolete" field to indicate that the file data is obsolete. Control passes to step 499, where the flowchart ends.

In step 470, the file system returns a value to the application that requested the file operation, indicating that an unknown operation was requested. Control passes to step 499, where the flowchart ends.

In step 490, the file system may invoke a "garbage collection" routine which frees/clears memory locations containing obsolete data/deleted files. If sufficient memory is available for storing a file, a node may be created for the file with the "file type" field containing a value indicating file is of non-linear type, else the file system returns a failure to the application, indicating that it was unable to create the file. Control passes to step 499, where the flowchart ends.

While certain operations on files have been described in the flow chart of FIG. 4, various other operations may also be possible.

As may be noted from the above descriptions, the file system can handle both linear and non-linear files. Certain file types that need fast and uninterrupted access may be stored as linear files, while other file types may be stored as non-linear files, thus providing a hybrid file system. A graphical illustration showing both linear as well as non-linear files co-existing in Flash 130 of FIG. 1 is briefly described next.

8. Hybrid File System

Figure 6:
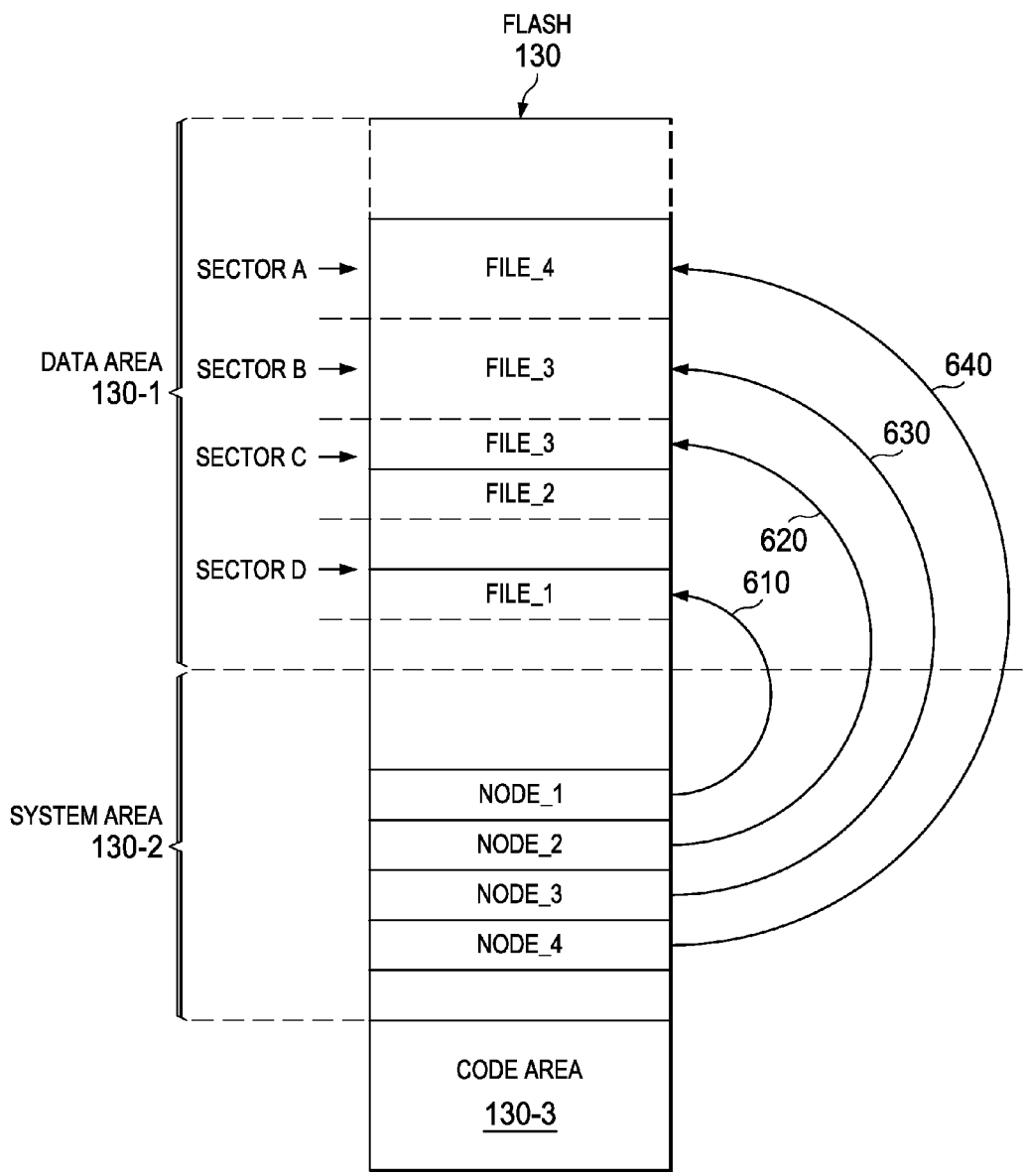
FIG. 6 is a block diagram illustrating the co-existence of linear and non-linear files according to an aspect of the present invention.

FIG. 6 is a diagram showing flash 130 (FIGS. 1A/1B) containing linear as well as non-linear files. Data area 130-1, system area 130-2 and code area 130-3 are the same as in FIG. 1B.

The diagram is shown containing four files, file_1 through file_4. File_1, file_2 and file_3 are non-linear files, while file_4 is a linear file. Each of files file_1 through file-4 have nodes NODE_1 through NODE_4 in that order associated with them. This association is depicted by arrows 610-640.

As seen from FIG. 6, linear file file_4 is stored in sector A. Sector A is reserved for file_4 and no other files are allowed to be stored in sector A.

File_1 is shown stored in sector D. Sector D may contain other files (not shown). File_2 is shown stored in sector C. A portion of file_3 is also stored in sector C and remaining portion of file_3 is stored in sector B.

Thus, linear and non-linear files may co-exist in the example system shown in FIG. 1A. Nodes NODE_1 through NODE_4 contain corresponding fields identifying the associated files as linear or non-linear, and providing other information such as link information, location information etc thus facilitating a file system in accessing the files. The various fields contained in a node in one embodiment of the present invention are described next.

9. Node Fields

FIG. 7 is a diagram showing the various fields of a node in an embodiment of the present invention.

A node contains seven fields as described below.

Field 710 stores the size of the file associated with the node, and is a 16-bit unsigned integer.

Field 720 stores the type of the associated file, i.e., whether the file is a linear or a non-linear file. In one embodiment a value of O×EE (hexadecimal) denotes that the file is a linear file and other values indicate that it is a non-linear file.

Field 730 stores various attributes of a file or a directory, such as whether the corresponding data is a starting chunk or an intermediate chunk of a file/directory, whether the file is a read-only file etc.

Field 740, in a node associated with a directory, contains a link to the next node (associated with a sub-directory or file) which is stored under (lower hierarchical level) the directory. In a node associated with a segmented file (file spanning multiple sectors), field 740 contains a link to the node associated with the next chunk of data pertaining to the segmented file. (Refer FIGS. 2B and 2C).

Field 750, in a valid node, contains a link to the node associated with the next file at the same hierarchical level. In an obsolete (deleted) node associated with a segmented file, field 750 contains a link to the to the node associated with the next chunk of data pertaining to the segmented file. (Refer FIGS. 2B and 2C).

Field 760 stores the location (address) of the file associated with the node.

Field 770 stores a value indicating the number of times the file/directory associated with the node has been updated.

Thus, the node structure described above facilitates a file system to handle linear and non-linear files. Frequently, a file system (such as a flash file system) may also provide power-fail-safe features that ensure that the directory/file structure is not rendered inconsistent when a power failure occurs during system operation. Such a feature is provided by a journaling mechanism where modifications/updates to be made to a file/directory and the corresponding node(s) are first entered in a journal (which may be a separate block of memory locations in a non-volatile memory such as flash 130 of FIGS. 1A/1B) before such changes are actually made. The journal structure in an embodiment of the present invention is accordingly briefly described below.

The journal structure in an embodiment contains the following fields.

1. State of journal entry—State of journal entry—this field defines the current state of each journal entry. It could indicate one of the three following states—
   WRITING—journal is being written to journal file.
   READY—journal has been written to journal file.
   DONE—journal has been written to file area in flash memory.

2. File type—This field denotes the type of file (linear or non-linear) on which an update/modify operation is to be performed.

3. Node reference of object (file/directory)—This field denotes the reference to the current node.

4. Node reference of object (file/directory) that is the object's parent/sibling—This field denotes the reference to the parent or sibling node of the current node.

5. Node reference of object (file/directory) that is to replace the object due to an update operation. This field denotes the reference to an old node for which a new node is being created.

The embodiment(s) of above can be implemented in various devices/systems. The description is continued with respect to an example device in which various aspects of the present invention are implemented.

10. Example Device

FIG. 8 is a block diagram illustrating the details of an example device incorporating some of the features provided by the present invention. Device 800, which may be a cell phone or a personal digital assistant containing an audio player, is shown containing processing unit 810, random access memory (RAM) 820, secondary storage 830, output interface 860, network interface 880, input interface 890 and removable storage unit 840. Each block is described in further detail below.

Output interface 860 provides output signals (e.g., audio signals to a speaker, not shown) for playback of songs stored in non-volatile memory 835. Input interface 890 (e.g., interface with a key-board and/or mouse, not shown) enables a user to operate device 800.

Network interface 880 may enable device 800 to send and receive data on communication networks using wireless network services. Network interface 880, output interface 860 and input interface 890 may be implemented in a known way.

RAM 820 and secondary storage 830 may together be referred to as a memory. RAM 820 receives instructions and data on path 850 from secondary storage 830, and provides the instructions to processing unit 810 for execution.

Secondary storage 830 may contain units such as non-volatile memory 835 (for example, flash memory described above) and removable storage controller 837. Secondary storage 830 may store the software instructions and data, including instructions providing file system features, which enable device 800 to provide several features in accordance with the present invention. Removable storage controller 837 stores (retrieves) data on (from) removable storage unit 840 (which could be a USB storage device, EPROM, etc, for example) on receiving corresponding commands from processing unit 810.

Processing unit 810 may contain one or more processors. Some of the processors can be general purpose processors which execute instructions provided from RAM 820. Some can be special purpose processors adapted for specific tasks (e.g., for memory/queue management). The special purpose processors may also be provided instructions from RAM 820.

In general processing unit 810 reads sequences of instructions from various types of memory medium (including RAM 820, secondary storage 830 and removable storage unit 840), and executes the instructions to provide various features of the present invention.

11. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of supporting a file system on a storage medium containing a plurality of blocks, wherein rewriting a portion of a block requires erasure of data in at least another portion of said block, said method comprising:
   storing in a nonvolatile memory data indicating whether each of said plurality of blocks is used to store a linear file, wherein the linear file is entirely stored in a single contiguous block of memory lying within the bounds of a sector; and
   wherein each of said plurality of blocks is not used for storing another file if data in said non-volatile memory indicates that the block is used to store a linear file.

2. The method of claim 1, wherein said non-volatile memory is also contained in said storage medium.

3. The method of claim 1, further comprising:
   receiving a request to create a first file on said storage medium;
   allocating a first block contained in said plurality of blocks to said first file; and
   indicating in said non-volatile memory whether said first file is created as a linear file or not.

4. The method of claim 3, wherein said receiving receives data indicating whether said first file is to be created as a linear file or not.

5. The method of claim 3, receiving a request to create a second file on said storage medium, considering for allocation to said second file only those segments that are not allocated for storing linear files.

6. The method of claim 5, wherein said second file is indicated to be a non-linear file and wherein data is allocated in a second block which is already allocated to store data corresponding to another file.

7. The method of claim 6, wherein said second file is stored in multiple blocks contained in said plurality of blocks.

8. The method of claim 3, wherein said first block is locked during a reading operation of said first file, wherein said locking prevents said first block from being accessed for erase operations.

9. A digital processing system comprising:
   a storage medium containing a plurality of blocks, wherein rewriting a portion of a block requires erasure of data in at least another portion of said block;
   a non-volatile memory storing data indicating whether each of said plurality of blocks is used to store a linear file or not, wherein the linear file is entirely stored in a single contiguous block of memory lying within the bounds of a sector; and
   a processor receiving a request to create a file, said processor determining that a first block contained in said plurality of blocks is suitable for allocation to said file only if said non-volatile memory indicates that said first block does not store a linear file,
   whereby each block allocated to a linear file is allocated exclusively to that linear file only.

10. The digital processing system of claim 9, wherein said non-volatile memory is also contained in said storage medium.

11. The digital processing system of claim 9, wherein said processor receives a request to create a first file on said storage medium, allocates a first block contained in said plurality of blocks to said first file, and indicates in said non-volatile memory whether said first file is created as a linear file or not.

12. The digital processing system of claim 11, wherein said processor receives data indicating whether said first file is to be created as a linear file or not.

13. The digital processing system of claim 11, wherein said processor receives a request to create a second file on said storage medium and considers for allocation to said second file only those segments that are not allocated for storing linear files.

14. The digital processing system of claim 13, wherein said second file is indicated to be a non-linear file and wherein data is allocated in a second block which is already allocated to store data corresponding to another file.

15. The digital processing system of claim 14, wherein said second file is stored in multiple blocks contained in said plurality of blocks.

16. The digital processing system of claim 11, wherein said first block is locked during a reading operation of said first file, wherein said locking prevents said first block from being accessed for erase operations.

17. An apparatus for supporting a file system on a storage medium containing a plurality of blocks, wherein rewriting a portion of a block requires erasure of data in at least another portion of said block, said apparatus comprising:

means for storing in a non-volatile memory data indicating whether each of said plurality of blocks is used to store a linear file, wherein the linear file is entirely stored in a single contiguous block of memory lying within the bounds of a sector; and wherein each of said plurality of blocks is not used for storing another file if data in said non-volatile memory indicates that the block is used to store a linear file.

18. A computer readable medium carrying one or more sequences of instructions for causing a system to support a file system on a storage medium containing a plurality of blocks, wherein rewriting a portion of a block requires erasure of data in at least another portion of said block, wherein execution of said one or more sequences of instructions by one or more processors contained in said system causes said one or more processors to perform the actions of:

storing in a nonvolatile memory data indicating whether each of said plurality of blocks is used to store a linear file, wherein the linear file is entirely stored in a single contiguous block of memory lying within the bounds of a sector; and wherein each of said plurality of blocks is not used for storing another file if data in said non-volatile memory indicates that the block is used to store a linear file.

* * * * *